United States Patent [19]
Rauch et al.

[11] 3,834,521
[45] Sept. 10, 1974

[54] AIR DRIVE FOR CONVEYOR

[75] Inventors: Richard A. Rauch, Woodbury;
George Camas, Scarsdale; Elliott Shulman, East Northport, all of N.Y.

[73] Assignee: CPE Industries, Inc., Queens, N.Y.

[22] Filed: May 15, 1972

[21] Appl. No.: 252,994

[52] U.S. Cl. .............................................. 198/203
[51] Int. Cl. .......................................... B65g 23/00
[58] Field of Search ....... 198/203; 91/306, 271, 265

[56] References Cited
UNITED STATES PATENTS

| | | | |
|---|---|---|---|
| 1,934,835 | 11/1933 | Weiss | 198/203 |
| 2,030,571 | 2/1936 | Cawley | 91/271 |
| 2,223,792 | 12/1940 | Muir | 91/306 X |
| 2,674,093 | 4/1954 | Slomer | 198/203 X |

Primary Examiner—Evon C. Blunk
Assistant Examiner—Douglas D. Watts
Attorney, Agent, or Firm—Stoll and Stoll

[57] ABSTRACT

An air drive for a conveyor comprising an air cylinder having air entry ports at each end and a valve to control air flow into the cylinder. The valve is actuated by a cam which is mounted on a crankshaft attached to the piston rod. As the piston reciprocates in the cylinder the cam oscillates, changing the operational position of the valve in accordance with the position of the piston. Also mounted on the crankshaft is a unidirectional clutch which in turn drives a conveyor in interrupted single direction motion.

6 Claims, 10 Drawing Figures

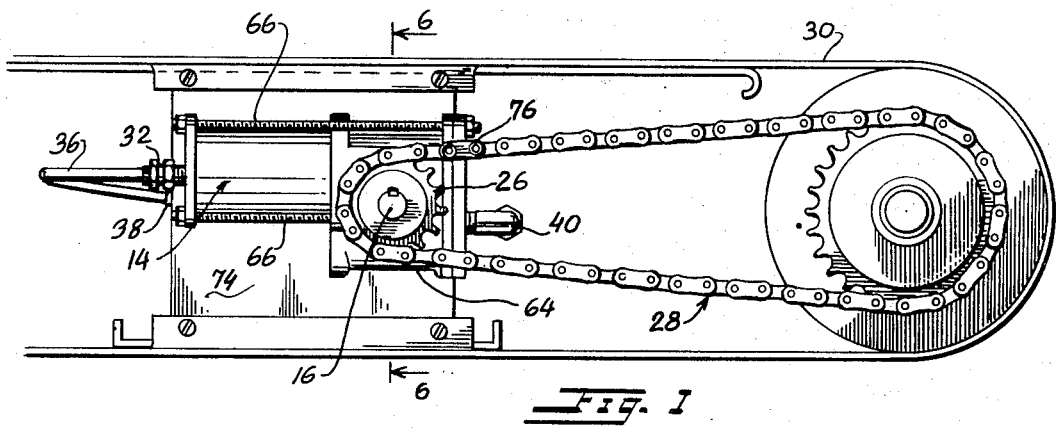
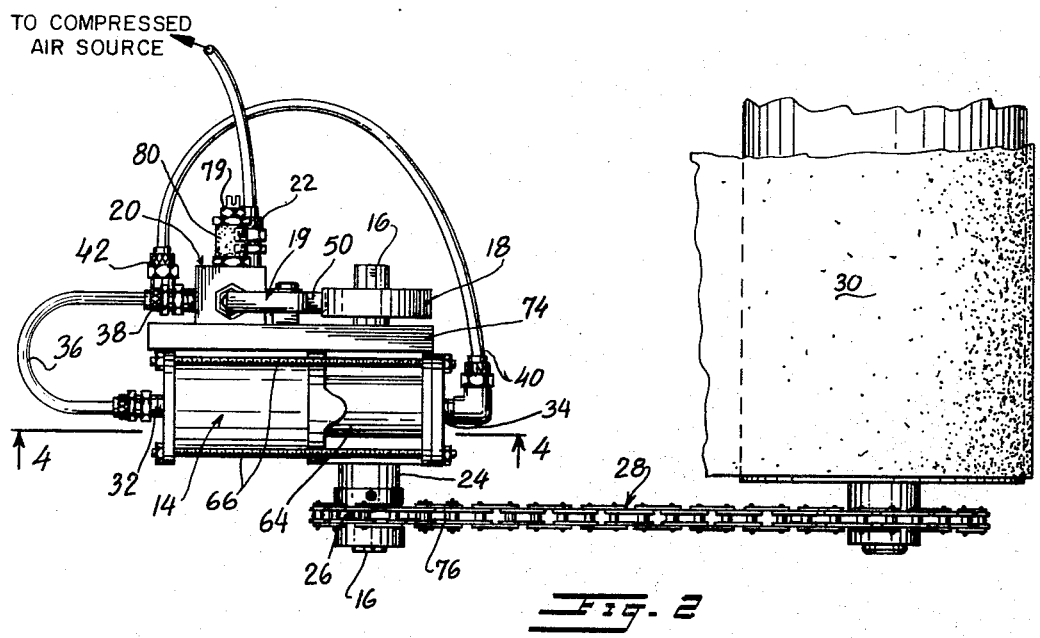
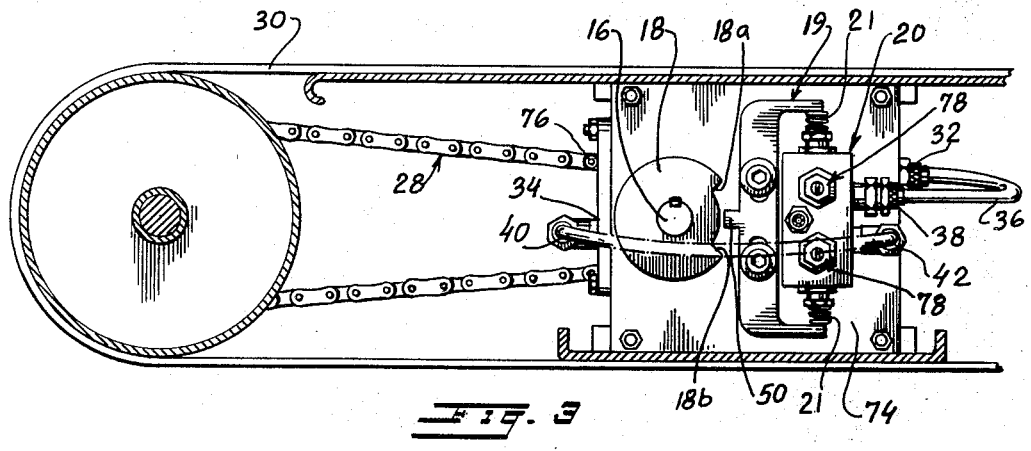

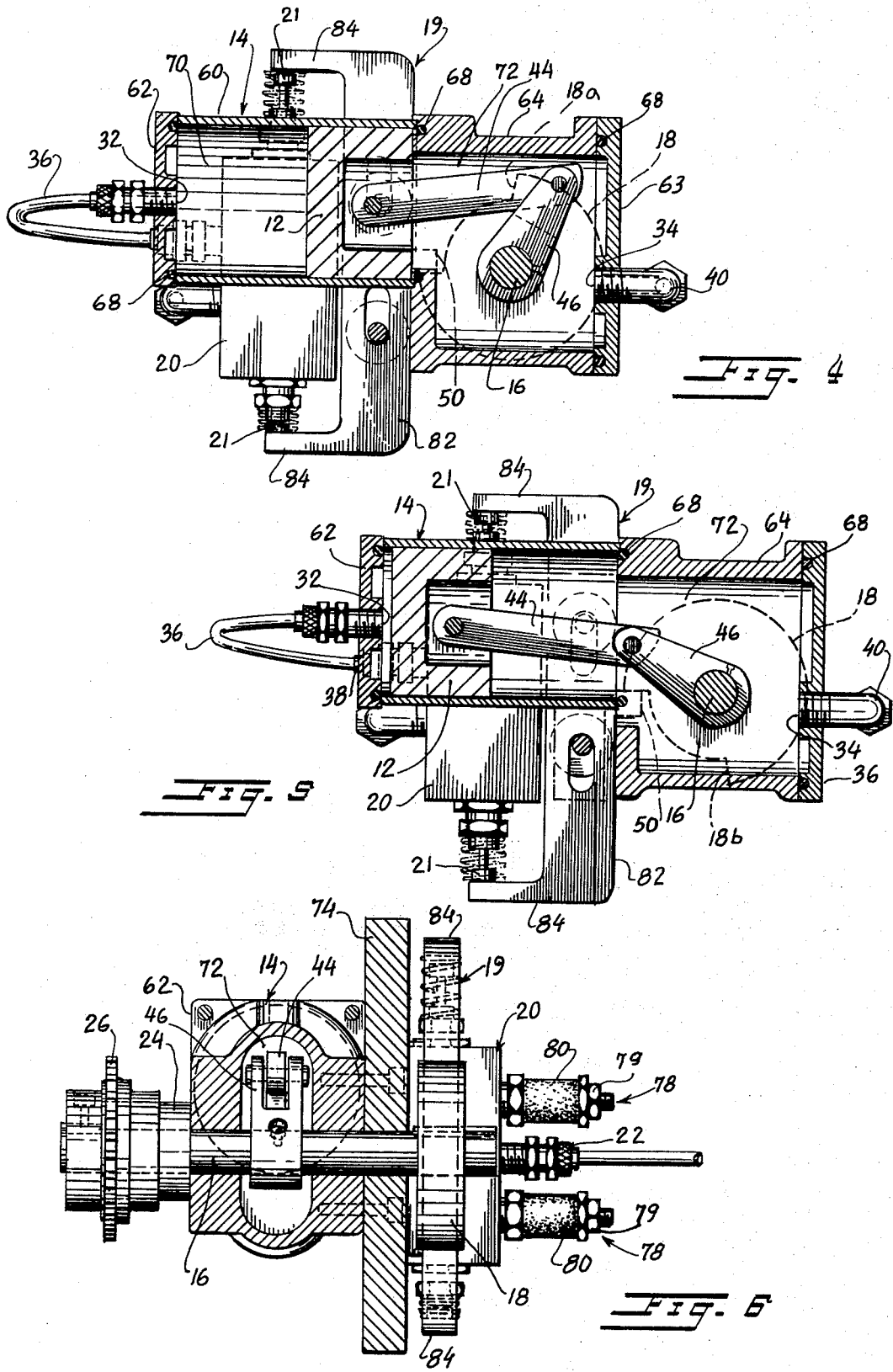

AIR DRIVE FOR CONVEYOR

BACKGROUND OF THE INVENTION

Supermarket checkout counters are conventionally provided with conveyor belts to conduct quantities of purchased food past a checkout clerk where they are registered and tallied. Conventional conveyor belts are provided with electric motor drives which tend to be cumbersome in size, expensive to purchase, to operate and to repair and which must be duplicated for each independently driven conveyor belt. In modern supermarkets with multiple checkout counters, many of which have more than one independent conveyor belt, the economics of the many electric motors and control mechanisms which are necessary becomes staggering.

It is well known in the supermarket industry that conventional checkout systems are inefficient, costly and slow and consumers are well aware of the irritation of waiting on a long checkout line while the checkout clerk must individually tally each item on the cash register and then individually package the purchased articles in a carrying sack. Frustrated supermarket managers frequently resort to providing an additional person for each checkout counter for the sole purpose of packaging the purchased articles in a shopping bag. It goes without saying that labor costs and incidentals are doubled.

A recent and important trend in the supermarket equipment industry is the attempted use of automatic means for conveying closed shopping bags to the checkout clerk, automatically opening each bag and automatically conveying each filled bag to a picked location. Such a trend is exemplified by the first Gravely patent recited below. Gravely, in fact, doubles the complication by showing two separate systems for each checkout counter, each system having separate mechanisms for supplying closed empty bags, for opening the bags and for conducting full bags to the pickup location. The purpose of this dual system is to provide the checkout clerk with a choice of bags so that purchased articles may be sorted in accordance, for example, with their fragility. This helps avoid the problem of a gallon of milk being placed on top of a dozen eggs. Obviously, however, the number of assorted controls, motors, and other power sources becomes extreme.

It is important to note that this trend constitutes only the attempts of equipment manufacturers. The attempts have apparently not resulted in economically practical machines and accordingly, the trend has not extended to mass use by supermarkets. The prior art may be described by the following patents:

| Pat. No. | Name |
|---|---|
| 1,942,360 | Light |
| 2,696,805 | Krohm |
| 2,744,618 | Seal |
| 2,883,004 | Bellino |
| 3,011,034 | Laviana et al. |
| 3,025,651 | Stanley |
| 3,062,324 | Hennion |
| 3,087,346 | Kroll et al. |
| 3,125,887 | Bouvier et al. |
| 3,162,094 | Toman |
| 3,507,192 | Stokke |
| 3,564,814 | Graveley |
| 3,626,662 | Graveley |

SUMMARY OF THE INVENTION

The present inventors have developed a novel method for unifying all drive mechanisms, control mechanisms and bag opening mechanisms to a single source of power and this centralized power supply system may be used for virtually all motive requirements of the "front end" of a supermarket, including all checkout functions and even door opening mechanisms. The central power supply is an air compressor. The present invention is of a conveyor drive mechanism which obtains its motive power from the central compressed air supply.

It is the drive for the conveyor which makes practical the use of compressed air, and the compressed air may then be extended to the other front end functions.

Briefly, and not by way of limitation, the present invention utilizes the reciprocating motion of a piston in a double-acting air cylinder to provide reciprocating rotational motion to a crankshaft. Mounted on the cranksahft for movement therewith is a double-faced cam which actuates the valve such that as the piston reaches one end of its stroke compressed air is forced into that end of the cylinder thereby driving the piston to the opposite end at which point, of course, the valve redirects air pressure to that opposite end of the cylinder. The cycle is continuous so long as a supply of compressed air is provided.

Mounted on the crankshaft is a unidirectional clutch which in effect converts the oscillating rotation of the crankshaft to a single direction of interrupted rotation. The clutch in effect cancels out reverse rotation of the crankshaft and transmits only forward rotation of the crankshaft. The clutch is connected to a pulley or sprocket wheel which engages a V-belt or chain, which in turn is connected to the conveyor belt.

Although forward motion of the conveyor belt is interrupted (being in accordance with the interrupted rotation of the clutch) the frequency of the forward motion is variable and can be so high that the interruptions are short and rapid enough to be disregarded. Exhaust air valves control speed in each direction of piston travel.

Air-driven pistons are relatively powerful and the supply of compressed air from a central source relatively plentiful at working pressures. The result is that a very compact power package, including double-acting cylinder, cam and valve mechanism and over-running clutch can be provided for each conveyor belt at substantial economic and space advantage over an electric motor drive. The unit is simple, reliable and long-lived.

BRIEF DESCRIPTION OF THE DRAWING

FIG. 1 is a side view of the air drive of the present invention showing a portion of a conveyor belt and the chain connection between the air drive and the belt.

FIG. 2 is a top view of the drive of FIG. 1 with the conveyor belt broken away to expose the drive.

FIG. 3 is a view similar to that of FIG. 1 but showing the opposite side of the drive.

FIGS. 4 and 5 are sectional views as taken across line 4—4 of FIG. 2. The piston and associated parts are show in FIG. 4 at the end of a drive stroke and in FIG. 5 are shown at the end of a return stroke.

FIG. 6 is a partial cross-sectional view taken across line 6—6 of FIG. 1.

Figure 7:
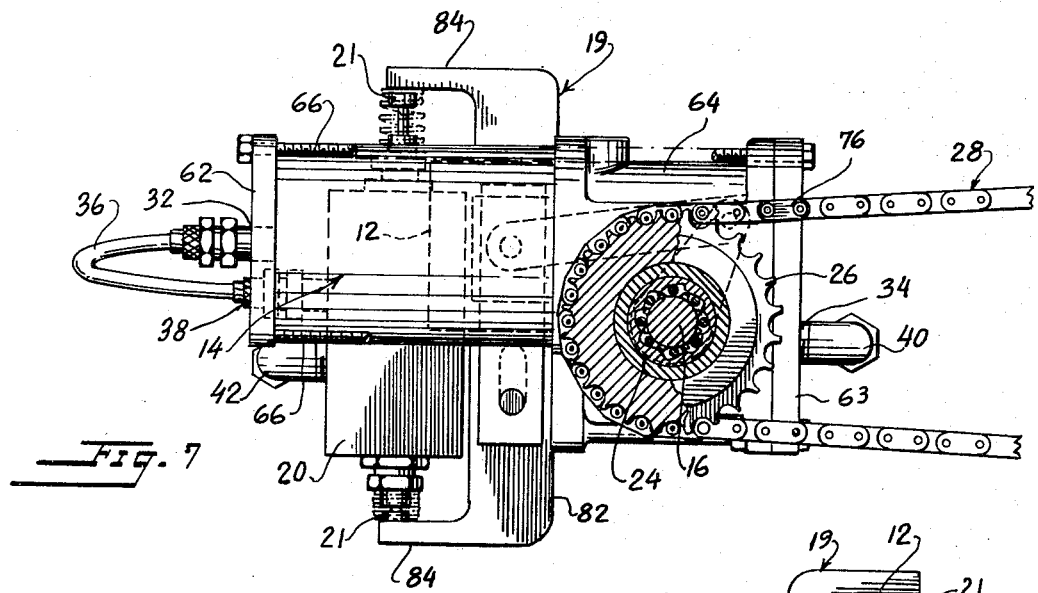
FIG. 7 is an enlarged view of the air drive in the position shown in FIG. 1. The sprocket has been partially broken away and the clutch shown in cross-section.

To aid in viewing the invention the mounting plate has been eliminated in FIGS. 4–10.

DESCRIPTION OF A PREFERRED EMBODIMENT OF THE INVENTION

The air drive 10 of the present invention utilizes the reciprocating motion of a piston 12 in a double-acting air cylinder 14 to provide reciprocating rotational motion to a crankshaft 16. Mounted on crankshaft 16 for movement therewith is a double-faced cam 18 which actuates a slide 19 of a valve 20 such that as piston 12 reaches the end of its stroke, compressed air from an external source is forced into the piston end of cylinder 14 thereby driving piston 12 to the opposite end at which point, of course, valve 20 redirects air pressure to the opposite piston end of the cylinder. The cycle is continuous so long as a supply of compressed air is provided from the external source through valve inlet port 22.

Mounted on crankshaft 16 is a unidirectional clutch 24 which in effect converts the reciprocating motion of the crankshaft to a single direction of interrrupted rotation. Clutch 24 in effect cancels out reverse rotation of crankshaft 16 and transmits only forward rotation of the crankshaft. Clutch 24 is connected to a pulley or sprocket wheel 26 which engages a V-belt or chain 28 which in turn is connected to a conveyor 30 which is driven thereby.

Double-acting air cylinder 14 is provided with a first opening 32 located at one end of the cylinder and a second opening 34 located at the opposite end of the cylinder. Appropriate tubing 36 connects first opening 32 to first valve port 38 and tubing 40 connects second opening 34 to second valve port 42, each valve port being part of valve 20. As will be described, valve 20 controls the flow of compressed fluid into either first opening 32 or second opening 34, forcing piston 12 to move in accordance therewith.

Piston 12 is connected by way of a piston rod 44 to the offset portion 46 of crankshaft 16. The length of piston rod 44 relative to the piston stroke and the size of the offset 46 is insufficient to permit the offset to rotate through a full circle. As piston 12 and rod 44 reach the end of their stroke and reverse direction, offset 46 does likewise and retraces its arcuate path of less than 180°. As the offset reciprocates through its arcuate swing of less than 180°, crankshaft 16 is driven to similar reciprocating rotation of less than 180° together with cam 18 and clutch 24 mounted thereon.

Clutch 24 is of the over-running or unidirectional type, for example a roller clutch in which rotation of the inner race relative to the outer race is permitted in only one direction, known as the over-running or disengaged direction. In the opposite direction of rotation the clutch engages, thereby preventing relative rotation between the inner and outer races. As applied to the present invention, the inner race is mounted on crankshaft 16 and chain sprocket 26 is mounted on the outer race. Rotation of the crankshaft in the engaged direction drives the sprocket, chain 28 and conveyor belt 30. Rotation of the crankshaft in the opposite direction disengages and idles the clutch and no motion is imparted to the sprocket, chain or conveyor belt. The result of the reciprocating rotation of the crankshaft is that the conveyor belt is intermittently driven in a single direction. Moreover, the idle interval between drive phases is so short, and the inertia of the driven mass of sprockets, chain, belt and whatever may be resting on the belt is so great, that the conveyor could well move continuously with any intermittent showing or stopping being undetectable by the human eye. Further, as will be made clear, piston speed is individually controllable in each direction of travel.

Figure 8:
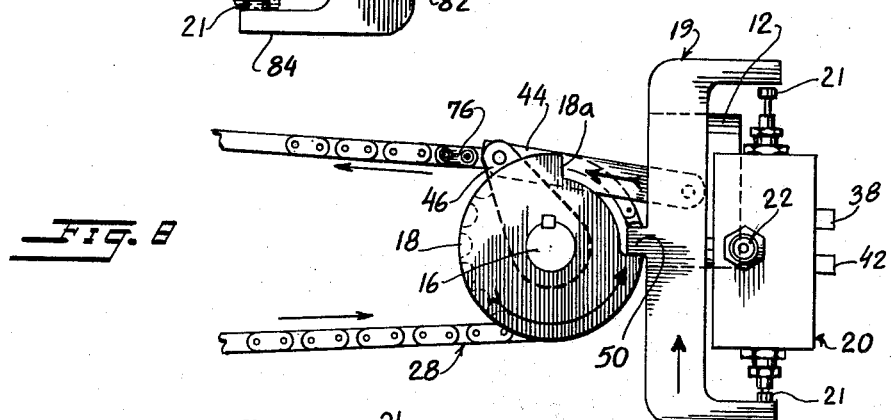
FIGS. 8, 9 and 10 are sequential views of operation of the invention. The direction of view is as shown in FIG. 3.
Figure 9:
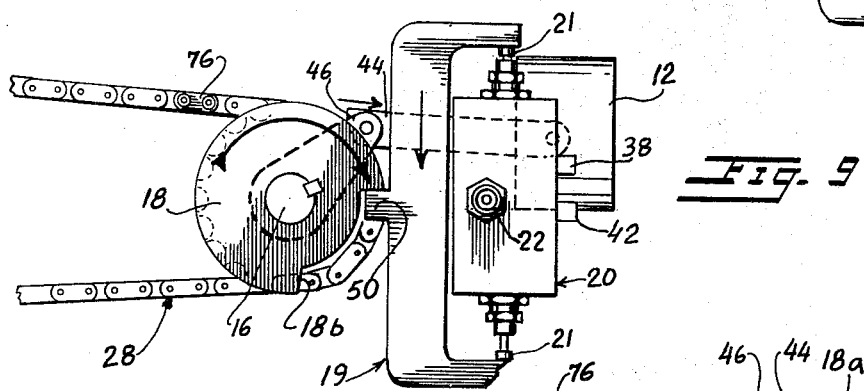
Figure 10:
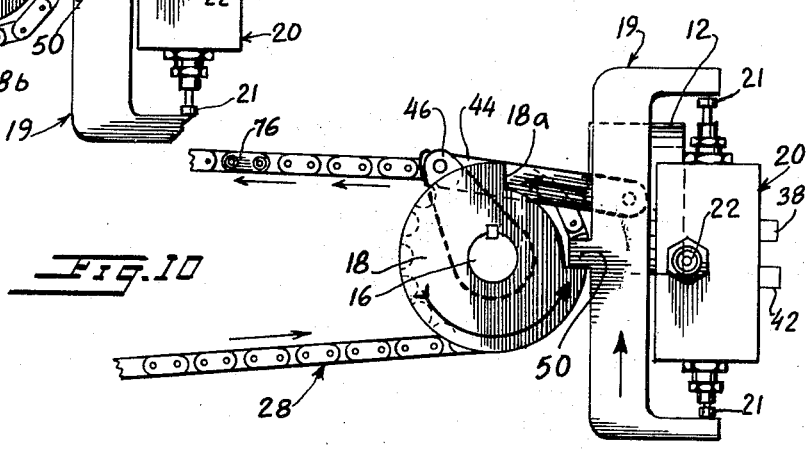

Also mounted on crankshaft 16 for reciprocating rotation therewith is cam 18 having two cam faces 18a and 18b which alternately engage a follower 50 on slide 19. As cam 18 reciprocates through its arc of rotation, slide 19 is alternately moved from an upper position to a lower position as shown in FIGS. 8–10.

Valve 20 remains in a given position until moved to another position by the action of slide 19. Thus, compressed fluid flows into a given end of cylinder 14 until such time as piston 12 reaches the opposite end of its travel through the cylinder whereupon cam 18 is so positioned as to engage slide 19 and move it so as to retract the compressed fluid flow through the valve to the end of the cylinder presently occupied by the piston. The compressed fluid drives the piston back to the first end of the cylinder whereupon cam 18 has re-engaged slide 19 and has again caused valve 20 to retract the fluid flow to the first end of the cylinder now occupied by the piston. The cycle repeats so long as compressed fluid is supplied to the system and external control means, not part of the invention, may be used to reduce or cut off the flow of compressed fluid thereby slowing down or stopping air drive 10. Conversely, such external control, which may be a simple valve, may commence or increase the flow of compressed fluid from an external source to air drive 10 whereupon the drive is actuated or its speed increased. Another method of speed control will be described below.

With the basic operation of the invention now made clear, details of construction will now be described.

Double-acting cylinder 14 comprises a cylindrical open-ended body portion 60, a first end plate 62 secured to a first end of cylindrical housing 60 and a crankshaft housing 64 secured to the opposite second end of cylindrical housing 60. Securement is simply by bolts 66 which extend fully the distance from first end plate 62 to crankshaft housing 64. Bolts 66 draw first end plate 62 and crankshaft housing 64 into leakproof contact with the ends of cylindrical housing 60. O-rings 68 located strategically provide additional seals.

First opening 32 is located in first end plate 62 and second opening 34 is located in a second end plate 63 which forms one wall of crankshaft housing 64, opposite cylindrical housing 60. It will be seen that piston 12 forms a movable division between first compression area 70 located within cylindrical housing 60 and bounded by first end plate 62, and second compression area 72 which is defined by piston 12, crankshaft housing 64, second end plate 63 and, when the piston is in the position shown in FIG. 5, by a portion of cylindrical housing 60.

Double-acting air cylinder 14 together with crankshaft housing 64 is mounted on one side of a mounting plate 74. Mounted on the opposite side of mounting plate 74 is valve 20, including slide 19. Crankshaft 16 extends laterally out of crankshaft housing 64 on both sides thereof. On one side crankshaft 16 extends through mounting plate 74 and cam 18 is mounted on crankshaft 16 adjacent slide 19. The opposite end of crankshaft 16 supports clutch 24 but, of course, the location of the clutch on the shaft may be wherever convenient. Mounted in turn upon clutch 24 is sprocket wheel 26 which drives chain 28.

FIGS. 8, 9 and 10 provide sequential views of the operation of the invention. To assist in visualizing motion of chain 28, a removable link 76 different in appearance from the other chain links, has been positioned so that its movement will define the movement of the chain. In FIG. 8 the crankshaft 16 has reached the limit of its travel counterclockwise as pictured therein. This position corresponds to the position shown in FIG. 4 wherein piston 12 is shown as having reached the end of its travel away from first end plate 62. Counterclockwise rotation of crankshaft 16 as seen in FIG. 8 being the engaging position of clutch 24, it will be seen that motion is imparted to chain 28 and thence to conveyor belt 30.

FIG. 9, which corresponds to FIG. 5, shows crankshaft 16 approaching the end of its return rotation, this being near the end of the return stroke of piston 12 to first end plate 62. Clockwise rotation of crankshaft 16 as viewed in FIG. 9 being the disengaged direction of clutch 24, chain 28 is not driven and merely idles. This does not mean that chain 28 is stationary, it means that chain 28 is not being driven except by whatever forces of inertia may be acting upon it.

FIG. 10 repeats the cycle of operation to the position shown in FIG. 8 but it will be observed that the stroke of piston 12 toward second end plate 63, and the counterclockwise rotation of crankshaft 16 as shown in FIG. 10, has driven chain 28 to a new position through engaged clutch 24.

An important and novel aspect of the invention is that, as piston 12 reaches the end of its stroke toward second end plate 63 (see FIGS. 4, 8 and 10) cam 18 has been rotated such that cam face 18b engages follower 50 and moves slide 19 upwardly. Compressed air is redirected by valve 20 into second compression area 72 to drive piston 12 through its return stroke.

At the end of the return stroke of piston 12 as shown in FIGS. 5 and 9, cam 18 has rotated with crankshaft 16 such that cam face 18a now engages follower 50 and drives slide 19 downwardly whereupon slide valve 20 again redirects the flow of compressed air, this time into first compression area 70 to drive piston 12 through its forward stroke toward second end plate 63.

Valve 20 also permits the exhaust of air from a compression area which is not being used to drive piston 12. For example, in the drive stroke of piston 12 toward second end plate 63 the air in second compression area 72 is exhausted through second opening 34 ino second valve port 42 and thence out of the valve through one of the exhaust ports 78. Exhaust ports 78 may be provided with filter screens 80 to prevent contamination from entering the system.

Exhaust ports 78 are speed control valves which individually control piston velocity in each direction of piston travel. Each exhaust port 78 has a needle valve (controlled by adjustment at locking nut 79) which varies the opening of the port. As the valve is closed, its exhaust port 78 is restricted thereby preventing escape of compressed fluid from the cylinder area to which it is connected. The trapped compressed fluid provides resistance to piston movement thereby slowing piston speed in one direction. Piston speed depends upon the pressure differential across the piston and equal pressure on both sides of the piston results in a stationary piston. This condition can easily be achieved by complete closure of an exhaust port valve. Because the source of compressed fluid generally provides a constant pressure, fully closing an exhaust port valve results in equal pressure on both sides of the piston and the piston is not moved. Accurate and infinite control of piston speed is accordingly possible, within boundary limits.

Valve 20 is a standard double bleed, double piloted air valve an example of which is Fabco Air Corporation (Saville, Ohio) Model 18DP4. Actuation or switching of valve 20 is by a pair of bleed pilot control valves 21 which are directly activated by slide 19. An example of a suitable bleed pilot control valve is that produced by Clippard Instrument Laboratories, Cincinnati, Ohio.

While the foregoing is illustrative of a preferred embodiment of the invention, it is clear that modifications may be had within the scope of the invention. Several examples will illustrate. Slide 19 is shown in the drawing as being substantially U-shaped, with a main element 82 having supporting arms 84 which extend from opposite ends of main stem 82 in one direction while follower 50 is shown as a central extension fro main stem 82 in an opposite direction. Clearly, the configuration of slide 19 including the location of follower 50 and of arms 84 may be modified as dimensions and the type of valve 20 utilized may require.

Another modification might be the type of clutch 24 which is used. The clutch shown in the drawing is a roller clutch of the type produced by The Torrington Company, Torrington, Conn.

Another modification which may be had would be to modify the configuration of cam 18 such that slide 19 is moved to a new position slightly in advance of piston 12 reaching the end of its stroke. This would direct compressed air into a compression area initially to provide a cushioning brake to the end of the piston stroke and then to drive the piston in the reverse direction. Such valve timing in relation to piston location should minimize mechanical shock and provide longer and smoother operation of the drive.

A further modification of the present invention is to substitute a shaft-mounted oscillating flap for the reciprocating piston, piston rod and crankshaft described above. (An example of the reciprocating drive described above is a Rota-Cyl, manufactured by Deltrol Corp., Bellwood, Ill.) The oscillating flap would be driven in the same manner as the reciprocating piston, with the cam and valve members substantially unchanged.

while the invention has been described in connection with compressed air as the driving medium, any pressurized fluid, such as hydraulic fluid, may be used.

What is claimed is:

1. A drive utilizing fluid pressure to obtain mechanical motion, comprising:
    a. a source of pressurized fluid;
    b. drive means, said drive means being driven by said pressurized fluid;
    c. valve means, said valve means being in control communication with said drive means;

d. cam means, said cam means being driven by said drive means, said cam means actuating said valve means in accordance with the position of moving portions of said drive means;
e. said drive means comprising reciprocating drive means and oscillating means, said oscillating means being driven by said reciprocating drive means;
f. said cam means being driven by said oscillating means;
g. said reciprocating drive means comprising a double-acting piston which reciprocates within a cylinder;
h. said oscillating means comprising a crankshaft, said crankshaft being driven by said reciprocating piston by means of a piston rod linkage;
i. said cam means being mounted on said crankshaft for oscillation therewith;
j. said cam means comprising a cam having two opposed cam surfaces, each cam surface being adapted to engage and to activate said valve means in accordance with the position of said piston;
k. said valve means comprising a multiple port valve and a slide to activate said valve;
l. said cam engaging said slide thereby actuating said valve;
m. said valve means additionally comprising at least one pilot valve;
n. each such pilot valve being in engagement with and activated by said slide whereby each said pilot valve controls said valve;
o. said slide being substantially U-shaped, having a pair of opposed arms extending in one direction from a main stem, and further having a follower extending in another direction from said main stem;
p. said arms engaging said pilot valves and said follower being alternately engaged by said cam faces.

2. A drive utilizing fluid pressure to obtain mechanical motion in accordance with claim 1, additionally comprising:
   a. a unidirectional clutch, said unidirectional clutch being mounted on said crankshaft,
   b. power transmitting means, said power transmitting means being mounted on said unidirectional clutch; and
   c. conveyor means, said conveyor means being driven by said power transmitting means,
   d. whereby one direction of oscillation of said crankshaft drives said conveyor means through said unidirectional clutch and the opposite direction of oscillation disengages said clutch and idles said conveyor means.

3. A drive utilizing fluid pressure to obtain mechanical motion in accordance with claim 2, wherein:
   said power transmiting means comprises a plurality of sprockets coupled by a chain.

4. A drive utilizing fluid pressure to obtain mechanical motion in accordance with claim 2, wherein:
   said power transmitting means comprises a plurality of pulleys coupled by a belt.

5. A drive utilizing fluid pressure to obtain mechanical motion in accordance with claim 2, wherein:
   said power transmitting means comprises a plurality of gears.

6. A drive utilizing fluid pressure to obtain mechanical motion in accordance with claim 2, wherein:
   said conveyor means comprises a conveyor belt.

* * * * *